March 28, 1961 W. C. JONES ET AL 2,976,567
PROCESS AND APPARATUS FOR UPGRADING THERMOPLASTIC FILM
Filed Oct. 16, 1957 2 Sheets-Sheet 1

INVENTORS.
William C. Jones
Walter A. Klein
BY Griswold & Burdick
ATTORNEYS

March 28, 1961 W. C. JONES ET AL 2,976,567
PROCESS AND APPARATUS FOR UPGRADING THERMOPLASTIC FILM
Filed Oct. 16, 1957 2 Sheets-Sheet 2

INVENTORS.
William C. Jones
Walter A. Klein
BY
Griswold & Burdick
ATTORNEYS

United States Patent Office 2,976,567
Patented Mar. 28, 1961

2,976,567

PROCESS AND APPARATUS FOR UPGRADING THERMOPLASTIC FILM

William C. Jones and Walter A. Klein, Midland, Mich., assignors to The Dow Chemical Company, Midland, Mich., a corporation of Delaware Filed Oct. 16, 1957, Ser. No. 690,578

5 Claims. (Cl. 18—10)

This invention relates to an improved process for upgrading thermoplastic film and to an apparatus for carrying out the same in continuous fashion. More particularly it relates to such a process for treating oriented thermoplastic films to render them non-blocking and to provide them with a better appearance than has been heretofore possible. For purposes of this application, the term "blocking" should be construed as the tendency of thin, unsoftened films to cling to themselves without the use of adhesives, and non-blocking means the absence of such clinging tendencies.

Thermoplastic films and particularly the oriented thermoplastic films prepared by the thermal extrusion of the normally crystalline vinylidene chloride polymers are useful packaging materials. As usually prepared the molten polymer is expressed through an annular die orifice to form a tube, the inner surface of the tube coated with a mineral oil or similar material to prevent the film from sticking when flattened in pinch rolls, the tube supercooled, oriented by stretching about an air bubble entrapped between pairs of pinch rolls, and finally wound on cores. The film as thus prepared is clear and transparent, has good strength and inertness to greases, oils, and similar solvents, has low moisture vapor transmission and other properties making it attractive as a packaging material. However, such film has a strong blocking tendency, requires slitting to produce standard sized sheets, and, as it is produced, sags due to uneven tensions during the wind-up and other handling operations. To overcome those difficulties and to upgrade the film to a product of commercial utility it has been the usual practice to subject the film to separate dusting, slitting, and normalizing operations. In conventional dusting procedure a high-melting, finely-divided substance, such as mica or talc, is blown against the inner surface of the film so as to imbed the particles in the surface and cause the surface to become roughened. As a consequence of the roughened surface, the blocking tendencies of the film are minimized. In the slitting procedure, the dusted flattened film tube is passed through rotary knives which remove the edges of the tube. This produces two flat sheets. In the normalizing procedure, the film sheets are held under a constant tension while being subjected to thermal conditions which cause shrinkage of the film. The normalizing technique results in a flat sheet with no sagging. The three separate treating operations that are conventionally employed require intermediate handling, increase the opportunities for breaks and for waste, and are uneconomical. As is apparent, this increases the cost of the film, and are time consuming. It would be desirable if the number of separate handling steps could be reduced in the manufacture of various thermoplastic films.

To this end, it is the principal object of this invention to provide an improved process for upgrading thermoplastic film which is achieved in a single, continuous operation.

It is a further object to provide an improved apparatus for carrying out that process.

The above and related objects are accomplished by means of a process wherein a thermoplastic film is fed at a constant rate around heated embossing rolls, then through a slitting means, and is finally wound on cores, the process conditions being such that the film is under a constant tension from the initial feed to the final wind-up. The invention likewise contemplates an improved apparatus that is adapted for the performance of the described process and which hereinafter is more fully described.

Although the process and apparatus of this invention may be used for upgrading any thin thermoplastic film it is especially well adapted for upgrading those oriented thermoplastic films prepared by the thermal extrusion of the normally crystalline vinylidene chloride polymers, such as the copolymers of vinylidene chloride with other monoethylenically unsaturated monomers, including vinyl chloride, vinylacetate, and acrylonitrile wherein the vinylidene chloride is present in the copolymer molecule in a predominant amount. Films of such copolymers are commonly prepared by the thermal extrusion of the molten polymer in flattened tubular form which must be slit to produce single sheets, are of uneven lateral stress (as evidenced by sagging of the central portion when a sheet of the film is held by the four corners) and have a strong blocking tendency.

In the annexed drawings and the following description is described a preferred embodiment of an apparatus that has been found to be useful in carrying out the process of the invention. It should be understood that the invention is limited only to the sequential arrangement of the apparatus components and is limited neither by the relative position of those components nor to the specific illustrated components. Known mechanical and electrical equivalents may be substituted without departing from the scope and spirit of the invention. In the illustrated embodiment;

Figure 1:
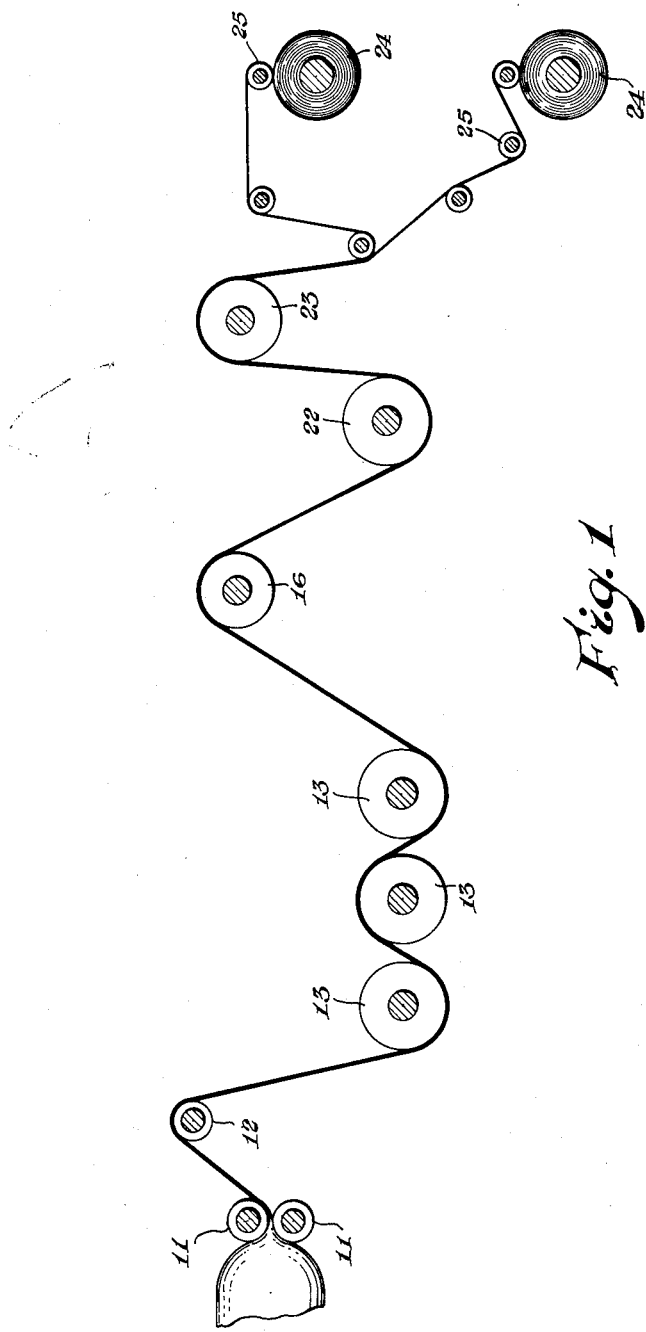
Fig. 1 is a schematic elevation of the apparatus.
Figure 2:
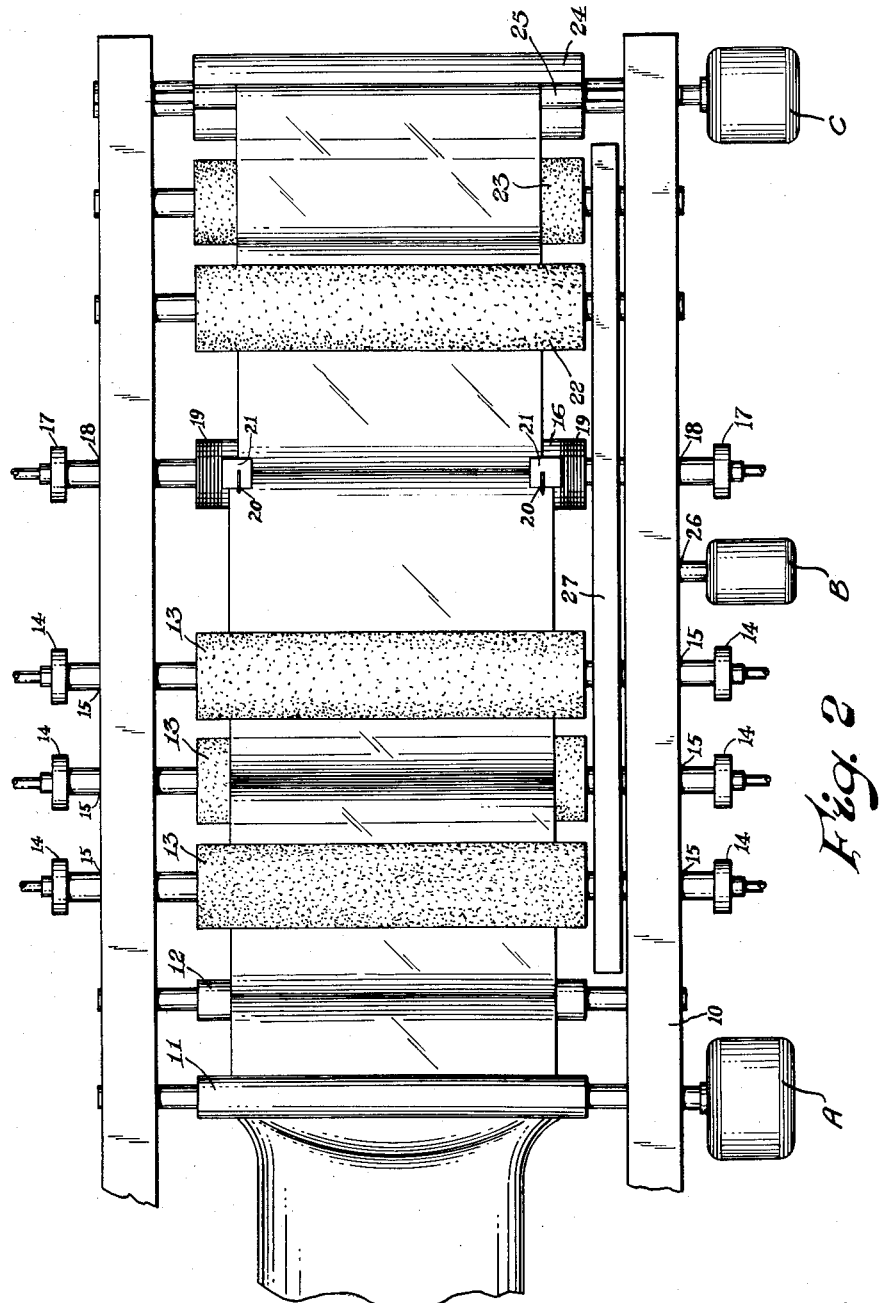
Fig. 2 is a schematic plan view of the apparatus.

In the illustrated embodiment shown in both figures of the drawing, a frame 10 is provided to hold other members of the apparatus. Located near one end of the frame 10 is a pair of rotatably driven snubbing feed rolls 11. Beyond the feed rolls 11 is an optionally idler roll 12 and beyond that idler roll 12 is a series of three or more heated embossing rolls 13. The embossing rolls 13 are rotatably driven and are positioned in fairly close proximity to one another. The embossing rolls 13 are heated to a temperature appreciably below both the melting and the decomposition temperature of the thermoplastic material to be used by passing steam or other heat transfer fluid sequentially through rotary union couplings 14, through the trunnions 15, and then through the hollow embossing rolls 13. The embossing rolls 13 are preferably of metal or other hard surface to provide optimum thermal conductance and also to provide optimum embossing characteristics. The surface of each of the embossing rolls 13 is roughened as by steel grit blasting to provide the embossing surface. It has been found that this surface roughness should be between about 400 to 500 root means square inches. That is attainable, for example, by grit blasting the surface of the steel roll with No. 25 steel grit at 100 pounds air pressure. When the roughness is appreciably less than 400 R.M.S. inches there is insufficient embossing to prevent blocking. When the roughness is appreciably greater than 500 R.M.S. inches, the surface characteristics such as gloss are adversely affected.

Mounted beyond the embossing rolls 13 and above the axial plane of those rolls 13 is a trimming roll 16. The trimming roll 16 is chilled by refrigeration or by passing heat transfer fluids sequentially through rotary union couplings 17, through the trunnions 18, and through the roll 16. The trimming roll 16 is preferably grooved circumferentially to provide guide grooves 19 in which a cutting blade 20 may ride to assure accurately trimmed edges. The cutting blade 20, which may be a stationary or rotary blade, is mounted in a suitable bracket 21 and positioned to cooperate with the grooved roll 16 to trim the edges off the film.

Positioned beyond the trimming roll 16 are two embossed rolls 22, 23 rotatably driven in a manner as will be later described. The embossed rolls 22, 23 are unheated so as not to appreciably disturb the relative degree of plasticity and orientation of the film coming off the trimming roll 16. If the embossed rolls 22, 23 are heated the film becomes reembossed and the function and effect of the prior embossing rolls 13 is negated. The surface of the rolls 22, 23 is roughened to serve the passive function of creating the least disturbance to the prior embossing as possible. When the rolls 22, 23 are highly polished, the peaks and valleys created by the embossing rolls, 13, tend to be flattened by mere application of pressure sufficient to cause cold flow of the film.

Positioned beyond the embossed rolls 22, 23 are suitable wind-up cores 24 and auxiliary idlers 25, as desired. The wind-up cores 24 are rotatably driven independently of the other parts of the apparatus, but at a constant torque to provide a uniform tension on the film at all stages of the process and to assure a smoothly wound roll of film. If uniform tension is not applied, changes in temperature, film variations, and other variables may cause wrinkling, stretching, and other imperfections in the wind-up.

The speeds of the rolls relative to each other are critical to the successful production of commercially usable film. As has heretofore been mentioned, the wind-up cores 24 are rotated at a constant torque. The feed rolls 11 are operated at a controllable rate. If the process is operated independently from a supply of film, the rate of feed will be dependent on the capacity of the apparatus and the characteristics of the film. However, the process is well adapted for incorporation as a sequential step in the film production. In such instances, the rate of rotation of the feed rolls 11 is a function of the rate of production of the film. Because there may be variations in the rate of feed to the feed rolls due to surging in the extruder or for other reasons, it is imperative that the rate of rotation of the feed rolls 11 be variable. The drive for those rolls indicated on the drawing as variable drive A, may be any form of variable power transmission, such as a variable speed or constant torque electric motor.

Rolls 13, 16, 22, and 23 should be rotated at the same peripheral speed to guard against undue shrinking, relaxing, or slippage of the film during these procedural steps. The same speed likewise insures that the film will be brought against each roll with the same constant pressure and will consequently be uniformly embossed. Any conventional power transmission system may be employed. Thus gear trains, belt drives, individual electric motors or other system may be used to rotate the various driven rolls. In the illustrated embodiment a variable drive electric motor, B, rotates a jack shaft 26 keyed to a drive gear (not shown) in gear box 27. The power is transmitted through gear box 27 to each of the rolls 13, 16, 22, and 23 and if all gears in the gear boxes are the same dimension all of the rolls 13, 16, 22 and 23 will rotate at the same speed.

Not only must the rates of peripheral speed of all rolls 11, 13, 16, 22, and 23 be constant but the ratio of the speed of feed rolls 11 to the other rolls 13, 16, 22 and 23 must be kept constant to maintain uniform tension on the film and to prevent slippage. A most convenient and, accordingly, preferred method of achieving a constant ratio even though the speed of the feed rolls might be altered is to connect variable drives A and B in an electrical cascaded circuit. By such means, once the speed ratio has been fixed, the rate of travel of the film through the apparatus may be varied with a single control and at the same time the tension on the film kept constant.

In operation, the film is threaded through the apparatus passing alternatively over and under each succeeding roll. The film is thus sequentially embossed, trimmed, and wound in a single continuous pass.

The process is adaptable for use with a single or double layer film. In order to effectively minimize the cling tendencies of such films, it is necessary to merely emboss or roughen one side of the film although no adverse effect is noticed if both sides are embossed. The process is adaptable for film of any thickness providing it is sufficiently flexible to be passed through the various steps of the process.

As is apparent from the foregoing, the process of this invention creates a roughened surface on the film which minimizes the cling or blocking tendencies of the film to itself. Additionally, it achieves this purpose without sacrificing the clarity or other properties or characteristics of the film and without introducing a separate dusting step which necessitates the use of foreign materials. The process is adaptable to any thermoplastic film without modification and with simple and easily determined adjustment of temperatures and speeds.

By way of further illustration, a copolymer prepared from 85 percent by weight of vinylidene chloride and 15 percent by weight of vinyl chloride plasticized with diisobutyl adipate was continuously extruded through an annular die into a supercooling bath. The super cooled tube was then passed through a warm bath and oriented by means of a trapped air bubble. The bubble was pinched off with a pair of rubber covered pinch rolls and continuously threaded around three hollow embossed steel rolls maintained at 100° C. with steam. The surface of the rolls were roughened by blasting with No. 25 steel grit at 100 pounds per square inch air pressure. The film was next passed over a chilled grooved roll maintained at 20° C. A cutting blade was adjusted to trim 2 inches off each edge of the flattened tube to leave film sheets 54 inches wide. The film was next threaded around two driven unheated embossed rolls and each of the two sheets finally was wound separately on a driven core operated at a constant torque. The pinch rolls were operated at a constant torque and a constant peripheral speed ratio to that of all the other driven rolls.

The film could be easily unwound and showed little tendency to cling to itself. When a sheet of the film was held by four corners there was no tendency to sag in the central portion.

We claim:

1. In the process for preparing clear, transparent, thermoplastic film wherein a thermoplastic normally crystalline vinylidene chloride polymer is thermally extruded through an annular orifice to form a tube which is supercooled, and subsequently biaxially distended to cause orientation therein, the improvement consisting of (1) embossing the so-formed oriented film to a surface roughness of from 400 to 500 root mean square inches without destroying the orientation and whereby the transparency of said film is not substantially altered, (2) chilling said film, and (3) winding up said film, while maintaining constant tension on said film from the orienting step to the wind-up step.

2. In the process for preparing clear, transparent, thermoplastic film wherein a thermoplastic normally crystalline vinylidene chloride polymer is thermally extruded through an annular orifice to form a tube which is supercooled and subsequently biaxially distended to cause orientation therein, the improvement consisting of (1) embossing the so-formed oriented film to a surface roughness of from 400 to 500 root mean square inches by passage of said oriented film in contact over heated rolls having a surface roughness of said magnitude and wherein said rolls are heated to a temperature below that at which the orientation of said film is altered and so that following embossing the transparency of said oriented film is not substantially altered, (2) chilling said film, and (3) winding up said film while maintaining constant tension on said film from the orienting step to the wind-up step.

3. An apparatus useful for finishing thermoplastic film which has been thermally extruded into a tube, supercooled, and radially oriented, consisting of a sequential combination in a frame of a first pair of pinch rolls, means for driving said pinch rolls at constant torque for flattening and forwarding the so flattened tube of oriented film, at least three driven embossing rolls in planar alignment, said embossing rolls having a surface roughness of from 400 to 500 root mean square inches, slitting means for trimming the edges of said flattened tube of oriented film, at least one driven roll having a surface roughness of from 400 to 500 root mean square inches, and a driven wind-up core, means for driving said three embossing rolls and said wind-up core at the same constant peripheral speed and additionally at a speed which is in constant ratio to the speed of said pinch rolls.

4. The apparatus claimed in claim 3 wherein said slitting means consist of a circumferentially grooved roll and a knife edge in stationary opposing relationship to said roll.

5. The apparatus claimed in claim 3 wherein said embossing rolls are heated.

References Cited in the file of this patent
UNITED STATES PATENTS

| | | |
|---|---|---|
| 2,279,901 | Domizi | Apr. 14, 1942 |
| 2,312,623 | Brooks | Mar. 2, 1943 |
| 2,452,080 | Stephenson | Oct. 26, 1948 |